(12) United States Patent
Noguchi et al.

(10) Patent No.: US 8,283,282 B2
(45) Date of Patent: Oct. 9, 2012

(54) CERAMIC STRUCTURE AND PROCESS FOR PRODUCING THE SAME

(75) Inventors: Yasushi Noguchi, Nagoya (JP); Kyoko Makino, Nagoya (JP); Takehiko Watanabe, Toki (JP)

(73) Assignee: NGK Insulators, Ltd., Nagoya (JP)

( * ) Notice: Subject to any disclaimer, the term of this patent is extended or adjusted under 35 U.S.C. 154(b) by 338 days.

(21) Appl. No.: 12/200,611

(22) Filed: Aug. 28, 2008

(65) Prior Publication Data

US 2009/0005240 A1 Jan. 1, 2009

Related U.S. Application Data

(63) Continuation of application No. PCT/JP2007/054484, filed on Mar. 7, 2007.

(30) Foreign Application Priority Data

Mar. 7, 2006 (JP) ................................. 2006-061589

(51) Int. Cl.
C04B 35/00 (2006.01)
C04B 35/01 (2006.01)
C04B 35/16 (2006.01)
C04B 35/18 (2006.01)
C04B 35/195 (2006.01)

(52) U.S. Cl. .................... 502/439; 428/116; 501/153

(58) Field of Classification Search .................... None
See application file for complete search history.

(56) References Cited

U.S. PATENT DOCUMENTS

| 4,404,007 A * | 9/1983 | Tukao et al. ................ 55/523 |
| 5,069,697 A | 12/1991 | Hamaguchi et al. |
| 5,185,110 A | 2/1993 | Hamaguchi et al. |
| 5,545,243 A | 8/1996 | Kotani et al. |
| 5,634,952 A * | 6/1997 | Kasai et al. .................. 55/302 |
| 6,017,473 A * | 1/2000 | Maier et al. ................ 264/29.6 |
| 6,773,481 B2 * | 8/2004 | Noguchi et al. ............... 55/523 |
| 2003/0007905 A1 | 1/2003 | Tanaka et al. |
| 2003/0041574 A1 | 3/2003 | Noguchi et al. |
| 2003/0166450 A1 | 9/2003 | Kumazawa et al. |
| 2004/0033175 A1* | 2/2004 | Ohno et al. .................. 422/180 |
| 2004/0112024 A1 | 6/2004 | Noguchi et al. |
| 2004/0166035 A1 | 8/2004 | Noda et al. |
| 2006/0193756 A1 | 8/2006 | Suzuki et al. |

FOREIGN PATENT DOCUMENTS

| CN | 1394686 A | 2/2003 |
| EP | 0 753 490 A1 | 1/1997 |
| JP | A-02-52015 | 2/1990 |
| JP | A-03-284313 | 12/1991 |
| JP | A-07-163823 | 6/1995 |
| JP | A-09-77573 | 3/1997 |
| JP | A-2002-219319 | 8/2002 |
| JP | A-2002-301323 | 10/2002 |
| JP | A-2003-33664 | 2/2003 |
| JP | A-2003-40687 | 2/2003 |
| JP | A-2004-315346 | 11/2004 |

* cited by examiner

*Primary Examiner* — Melvin C Mayes
*Assistant Examiner* — Colin W Slifka
(74) *Attorney, Agent, or Firm* — Oliff & Berridge, PLC

(57) ABSTRACT

There is disclosed a ceramic structure which comprises a material having a controlled pore distribution and including cordierite as the main crystal phase. In the pore distribution, the volume of pores having pore diameters smaller than 20 μm accounts for 15% or less of the total pore volume, and the volume of pores having pore diameters of 20 to 100 μm accounts for 70% or more of the total pore volume. This ceramic structure is suitable for realizing a ceramic catalyst body which has excellent purification efficiency, is reduced in pressure loss, and is mountable even in a limited space.

3 Claims, 5 Drawing Sheets

CERAMIC STRUCTURE AND PROCESS FOR PRODUCING THE SAME

TECHNICAL FIELD

The present invention relates to a ceramic structure on which a catalyst is carried and thereby which can become a ceramic catalyst body for use in purification of a component to be purified, for example, carbon monoxide (CO) included in an exhaust gas discharged from a car engine or the like, and it also relates to a process for producing the same.

BACKGROUND ART

To purify an exhaust gas discharged from any type of engine or the like, a catalyst body (hereinafter referred to as a ceramic catalyst body in the present description) is utilized in which a catalyst is carried on, for example, a ceramic structure (a honeycomb structure) having a honeycomb structure. FIGS. 4 to 6 are diagrams showing one example of the ceramic catalyst body. The ceramic catalyst body having the honeycomb structure has a structure in which a catalyst layer 15 is carried on the surface of a partition wall 4 forming a cell 3 as shown in FIG. 6. As shown in FIGS. 4, 5, the exhaust gas is allowed to flow into the cells 3 from the side of one end face 2a of a ceramic catalyst body 60 (a ceramic structure 11), brought into contact with catalyst layers (not shown) on the surfaces of the partition walls 4, and discharged from the side of the other end face 2b of the structure, whereby the exhaust gas can be purified (e.g., see Patent Document 1).

In a case where the exhaust gas is purified using the ceramic catalyst body, in order to improve purification efficiency, the hydraulic diameter of the cells is decreased, and the surface area of the partition walls is increased, whereby the transmission of the components to be purified included in the exhaust gas from the exhaust gas to the catalyst layers on the surfaces of the partition walls is preferably promoted as much as possible. Moreover, to realize this, a method of increasing the number of the cells (a cell density) per unit area is employed. It is known that the transmission ratio of the components to be purified from the exhaust gas to the catalyst layers on the surfaces of the partition walls increases in inverse proportion to the square of the hydraulic diameter of the cells. As the cell density is increased, the transmission ratio of the components to be purified improves. However, pressure loss tends to increase in inverse proportion to the square of the hydraulic diameter of the cells, so that a problem occurs that the pressure loss also increases with the improvement of the transmission ratio of the components to be purified. It is to be noted that examples of a prior document concerning a countermeasure for preventing the increase of the pressure loss include Patent Documents 2 and 3.

Moreover, it is known that in a case where the rate of diffusion of the components to be purified in the catalyst layer, the purification efficiency of the ceramic catalyst body tends to decrease. Therefore, to increase the purification efficiency of the exhaust gas, it is preferable not only to increase the surface area of the catalyst layer but also to decrease the thickness of the catalyst layer on the surface of the partition wall, which is usually about several ten μm, whereby the diffusion rate of the components to be purified in the catalyst layer is preferably increased. However, in this case, the cell density and the surface area of the catalyst layer are easily increased, and the transmission ratio of the components to be purified increases, but the problem that the pressure loss increases is not solved.

Furthermore, the inflow diameter of the ceramic catalyst body is increased, and the flow rate of the exhaust gas to be circulated is decreased, whereby the pressure loss can be decreased while maintaining or increasing the purification efficiency of the exhaust gas. However, when the size of the ceramic catalyst body is enlarged, a mounting space is limited, so that a problem that it becomes difficult to mount the structure on a car remains to be unsolved.

Patent Document 1: JP-A 2003-33664
Patent Document 2: JP-A 2002-219319
Patent Document 3: JP-A 2002-301323

DISCLOSURE OF THE INVENTION

The present invention has been developed in view of such a problem of a conventional technology, and an object thereof is to provide a ceramic structure which is suitable for realizing a ceramic catalyst body having excellent purification efficiency, having reduced pressure loss and mountable even in a limited space, and to provide a process for producing the same. As a result of intensive investigation, it has been found that catalyst layers can be carried on the inner surfaces of pores in the ceramic structure to obtain the ceramic catalyst body having excellent purification efficiency and mountable even in a limited space. Moreover, it has been found that to satisfy the requirement of reduced pressure loss and to obtain a surface area sufficient for realizing high purification efficiency, it is important to increase the pore diameters of the ceramic structure as a catalyst carrying target to such an extent that an exhaust gas can pass through partition walls, and it is also important to decrease the fluctuations of the pore diameters, whereby the present invention has been developed. Specifically, according to the present invention, the following means for solving the problem are provided.

According to the present invention, there is provided a ceramic structure which comprises a material having a controlled pore distribution and including cordierite as the main crystal phase, wherein in the pore distribution, the volume of pores having pore diameters smaller than 20 μm accounts for 15% or less of the total pore volume, and the volume of pores having pore diameters of 20 to 100 μm accounts for 70% or more of the total pore volume.

The ceramic structure according to the present invention includes cordierite as a main crystal, but may contain another crystal phase such as mullite, zircon, aluminum titanate, clay bond silicon carbide, zirconia, spinel, indialite, sapphirine, corundum or titania. Moreover, these crystal phases may be contained alone or as a combination of two or more of them simultaneously.

According to the ceramic structure of the present invention, in the pore distribution, the volume of pores having pore diameters larger than 100 μm accounts for 25% or less of the total pore volume. However, the sum of the volume of the pores having pore diameters smaller than 20 μm, the volume of the pores having pore diameters of 20 to 100 μm and the volume of pores having pore diameters larger than 100 μm is equal to the total pore volume.

In the ceramic structure according to the present invention, the porosity is preferably 50 to 70%. The porosity mentioned in the present description is measured with a mercury penetration porosimeter.

In the ceramic structure according to the present invention, a thermal expansion coefficient at 40 to 800° C. is preferably $1.0 \times 10^{-6}$/° C. or less.

The ceramic structure according to the present invention preferably has a honeycomb structure in which a plurality of cells communicating between two end faces are formed by partition walls, that is, a honeycomb structure body.

Moreover, according to the present invention, there is provided a process for producing a ceramic structure by use of a ceramic material including a cordierite forming material as a main material, wherein the cordierite forming material contains 5 to 35 mass % of alumina having an average particle diameter of 13 μm or more. The average particle diameter mentioned in the present description is measured with a laser type particle size distribution measurement device. The average particle diameter of alumina is preferably 13 to 30 μm, more preferably 15 to 20 μm.

In the cordierite forming material as the main material, components are blended so as to obtain the theoretical composition of cordierite crystals (a range of a chemical composition including 42 to 56 parts by mass of silica ($SiO_2$), 30 to 45 parts by mass of alumina ($Al_2O_3$) and 12 to 16 parts by mass of magnesia (MgO)). Therefore, the cordierite forming material includes a silica source component, a magnesia (MgO) source component, an alumina source component and the like. As the alumina source component having defined average particle diameter and content, aluminum hydroxide or aluminum oxide is preferably employed.

In the process for producing the ceramic structure according to the present invention, it is preferable that the ceramic material contains a pore former in addition to the main material. As the pore former, for example, a hollow or solid resin such as graphite, foam resin, water absorbing polymer, flour, starch, phenol resin, polymethyl methacrylate, polyethylene, polyethylene terephthalate, Shiras balloon or fly ash balloon may be employed. In particular, graphite, foam resin or water absorbing polymer is preferably employed. Moreover, in addition to a spherical form, such a pore former preferably has a rhombic shape or a confetti-like shape, and this shape is suitable for controlling a pore shape.

The process for producing the ceramic structure according to the present invention can suitably be employed in a case where a ceramic structure having a porosity of 50 to 70% is obtained.

The process for producing the ceramic structure according to the present invention can suitably be employed for obtaining a ceramic structure having a thermal expansion coefficient of $1.0 \times 10^6/°$ C. or less at 40 to 800° C.

The process for producing the ceramic structure according to the present invention can suitably be employed for obtaining a ceramic structure having a honeycomb structure in which a plurality of cells communicating between two end faces are formed by partition walls having a thickness of 150 to 700 μm. The thickness of the partition walls of the ceramic structure as a production target is preferably 200 to 600 μm, further preferably 300 to 500 μm, especially preferably approximately 480 μm (approximately 19 mil) in a case where the structure is applied to a catalyst body. When the thickness of the partition walls is smaller than 150 μm, strength becomes insufficient, and thermal shock resistance sometimes decreases. On the other hand, when the thickness of the partition walls exceeds 700 μm, the pressure loss tends to increase. It is to be noted that 1 mil is 1/1000 inch, and about 0.025 mm.

The process for producing the ceramic structure according to the present invention can suitably be employed for obtaining a ceramic structure having a honeycomb structure in which a plurality of cells communicating between two end faces are formed by partition walls, and having a cell density of 40 to 400 cells/in². The cell density of the ceramic structure as the production target is more preferably 50 to 300 cpsi, further preferably 60 to 100 cpsi, especially preferably approximately 80 cpsi in a case where the structure is applied to the catalyst body. When the cell density is less than 40 cpsi, contact efficiency with respect to the exhaust gas tends to run short. On the other hand, when the cell density exceeds 300 cpsi, the pressure loss tends to increase. It is to be noted that "cpsi" stands for "cells per square inch", and is a unit indicating the number of the cells per square inch. 10 cpsi is about 1.55 cells/cm².

Furthermore, according to the present invention, there is provided a process for producing a ceramic catalyst body, in which after obtaining the ceramic structure having the honeycomb structure in which the plurality of cells communicating between two end faces are formed by the partition walls by one of the above processes for producing the ceramic structure, the cells of the ceramic structure are plugged in one of the two end faces, plugging portions alternately arranged in the respective end faces so as to have a checkered pattern, and further catalyst layers are formed on the inner surfaces of the cells and the inner surfaces of pores in the partition walls forming the cells to obtain the ceramic catalyst body.

In the ceramic structure according to the present invention, in the pore distribution, the volume of pores having pore diameters smaller than 20 μm accounts for 15% or less of the total pore volume, and the volume of pores having pore diameters of 20 to 100 μm accounts for 70% or more of the total pore volume. In a case where the ceramic structure in which such pore distribution is narrow (with only small fluctuations) and in which the volume of the pores having pore diameters of 20 to 100 μm accounts for 70% or more of the total pore volume accounts for a large part is used as the ceramic catalyst body in which the catalyst layers are formed on the inner surfaces of the pores, the structure is not easily clogged with soot or ash, and the pressure loss can be suppressed. Alternatively, the exhaust gas uniformly and easily flows through the respective pores. Therefore, even when an inflow diameter is not increased, the valid surface area of the pores that come in contact with the exhaust gas increases, and the purification efficiency of the catalyst improves. In consequence, the structure can be installed even in a limited space and can be mounted on a car or the like.

In a porous honeycomb filter disclosed in Patent Document 2, the volume of pores having pore diameters smaller than 10 μm accounts for 15% or less of the total pore volume, and the volume of pores having pore diameters of 10 to 50 μm accounts for 75% or more of the total pore volume. Therefore, when the filter is used as the catalyst body, the structure is clogged with the soot or ash of the exhaust gas, and the pressure loss easily increases. However, the ceramic structure according to the present invention has large pore diameters, and hence the above problem does not occur. Moreover, in a honeycomb ceramic filter disclosed in Patent Document 3, the pore distribution is broad (wide). Therefore, the filter has a problem that the exhaust gas preferentially flows through large pores, and the catalyst carried on relatively small pores is not effectively utilized. However, the ceramic structure according to the present invention has sharp (narrow) pore distribution, and the pores having pore diameters of 10 to 50 μm account for a greater part. Therefore, the exhaust gas easily and uniformly flows through the whole structure, and the above problem does not occur.

In the preferable configuration of the ceramic structure according to the present invention, the porosity is in a range of 50 to 70%. Therefore, after decreasing the pressure loss, a thermal capacity is decreased, whereby the mechanical strength of the structure can be held. When this ceramic structure is applied to the catalyst body, the porosity of the structure is more preferably 60 to 70%, especially preferably approximately 65%.

In the preferable configuration of the ceramic structure according to the present invention, the thermal expansion coefficient at 40 to 800° C. is $1.0 \times 10^{-6}/°$ C. or less. Therefore, thermal stress in a case where the structure is exposed to the high-temperature exhaust gas can be minimized, and destruction due to the thermal stress can be prevented. When the ceramic structure is applied as the catalyst body, the thermal expansion coefficient at 40 to 800° C. is further preferably 0 to $0.8 \times 10^{-6}/°$ C., especially preferably 0 to $0.5 \times 10^{-6}/°$ C.

Figure 1:
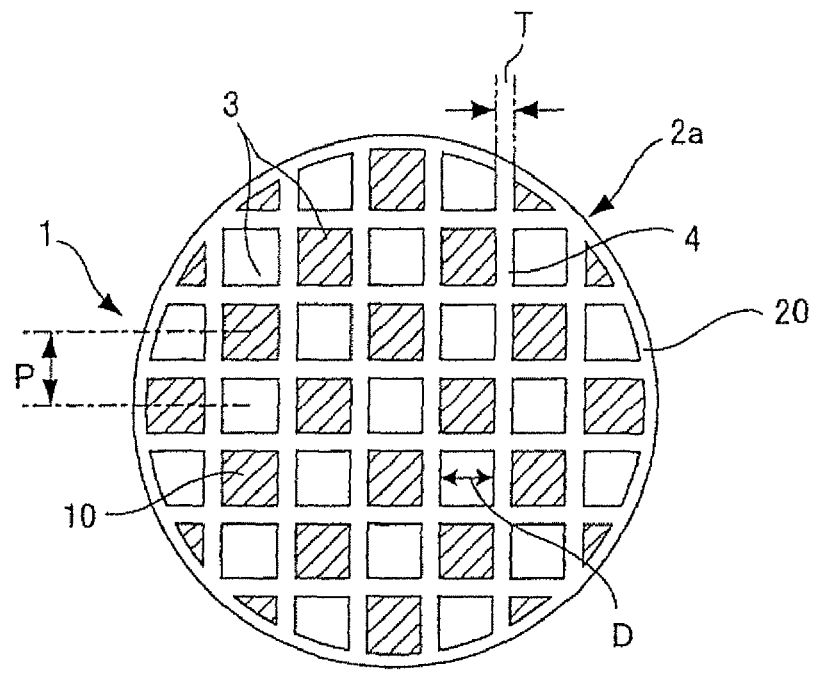
FIG. 1 is a front view schematically showing one embodiment of a ceramic catalyst body to which a ceramic structure according to the present invention is applied.

DESCRIPTION OF REFERENCE NUMERALS 1, 11: ceramic catalyst body, 2a, 2b: end face, 3: cell, 4: partition wall, 5, 15: catalyst layer, 10: plugging portion, 20: outer wall, 25: pore, 35: catalyst layer carrying pore, D: cell hydraulic diameter, P: cell pitch, T: partition wall thickness.

BEST MODE FOR CARRYING OUT THE INVENTION

A mode for carrying out the present invention will hereinafter be described with reference to the drawings. However, it should be understood that the present invention is not limited to the embodiment when interpreted. The present invention can variously be changed, modified, improved or replaced based on the knowledge of a person skilled in the art within the scope of the present invention. For example, the drawings show the preferable embodiment of the present invention, but the present invention is not limited to the configuration or information shown in the drawings. Means similar or equivalent to the means described in the present description can be applied in carrying out or verifying the present invention, but preferable means are described hereinafter.

Figure 2:
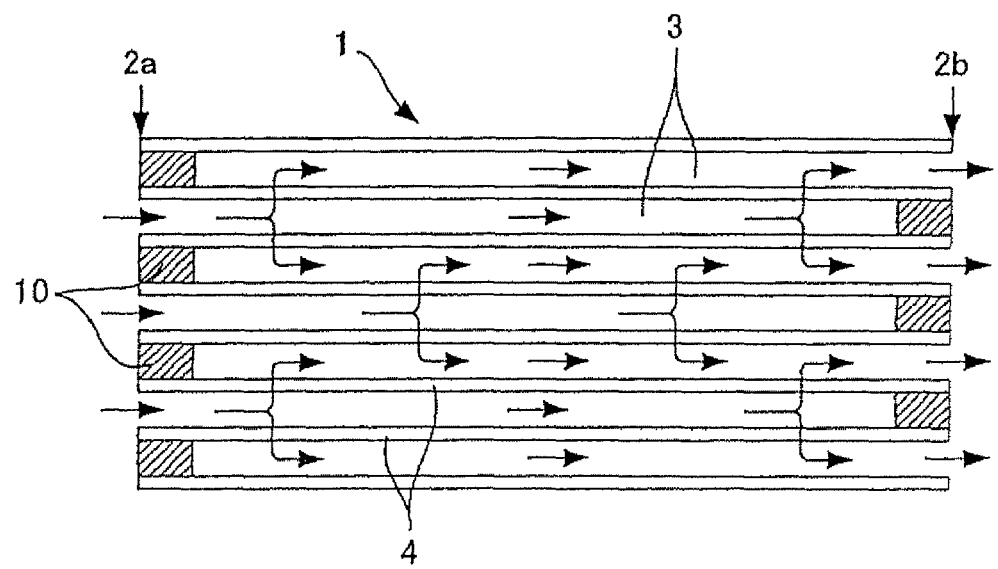
FIG. 2 is a sectional view schematically showing one embodiment of the ceramic catalyst body to which the ceramic structure according to the present invention is applied.

First, a case where a ceramic structure is applied to a ceramic catalyst body will be described. FIG. 1 is a front view schematically showing one embodiment of a ceramic catalyst body to which a ceramic structure according to the present invention is applied, and FIG. 2 is a sectional view schematically showing one embodiment of the ceramic catalyst body to which the ceramic structure according to the present invention is applied. Furthermore, FIG. 3 is a partially enlarged view schematically showing one embodiment of the ceramic catalyst body to which the ceramic structure according to the present invention is applied.

Figure 3:
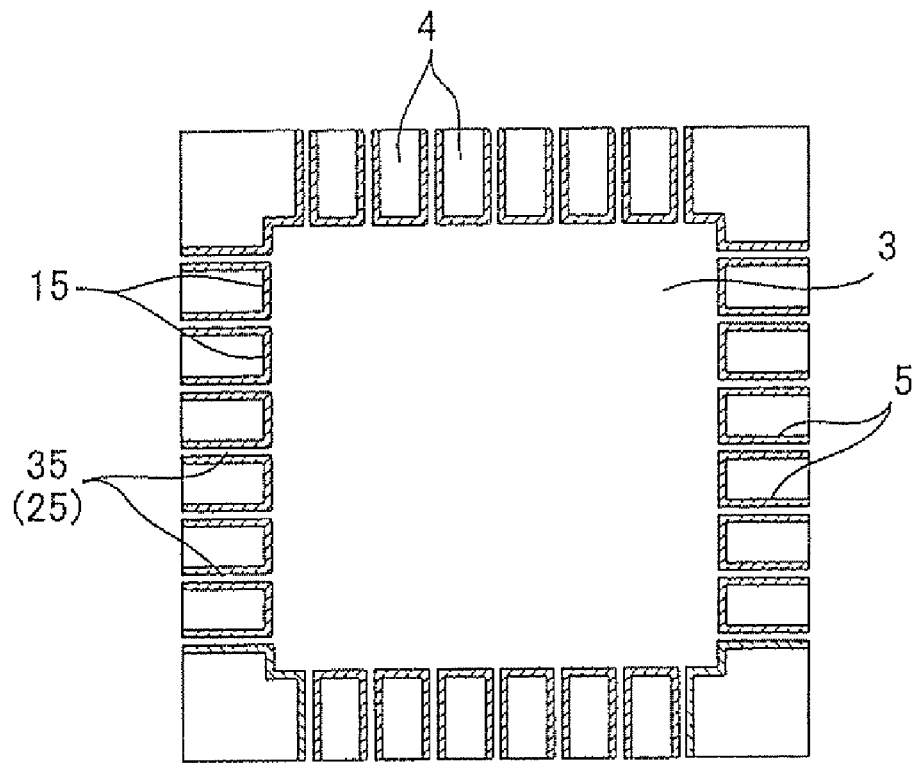
FIG. 3 is a partially enlarged view schematically showing one embodiment of the ceramic catalyst body to which the ceramic structure according to the present invention is applied.
Figure 4:
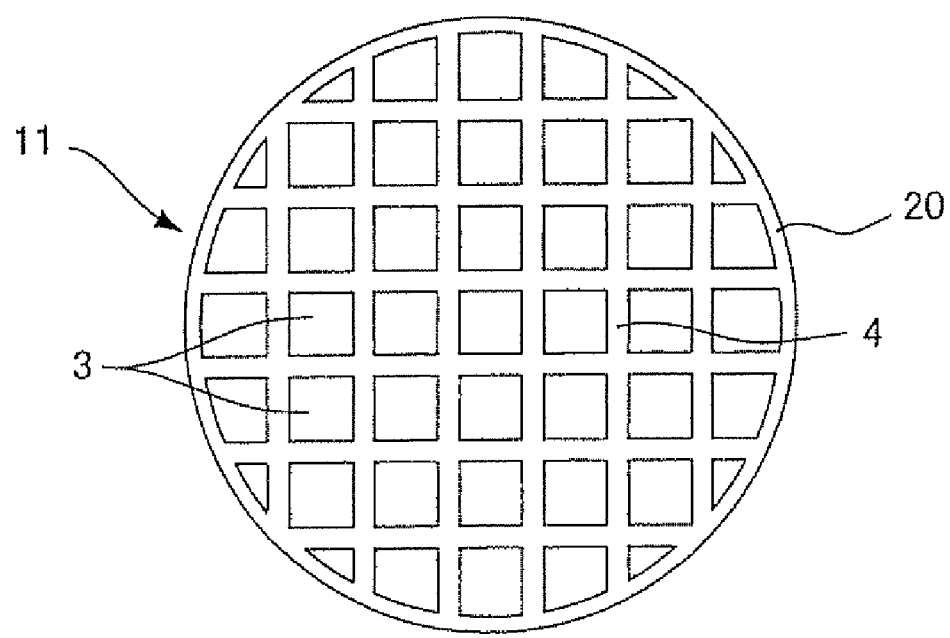
FIG. 4 is a front view schematically showing one embodiment of a conventional ceramic catalyst body.
Figure 5:
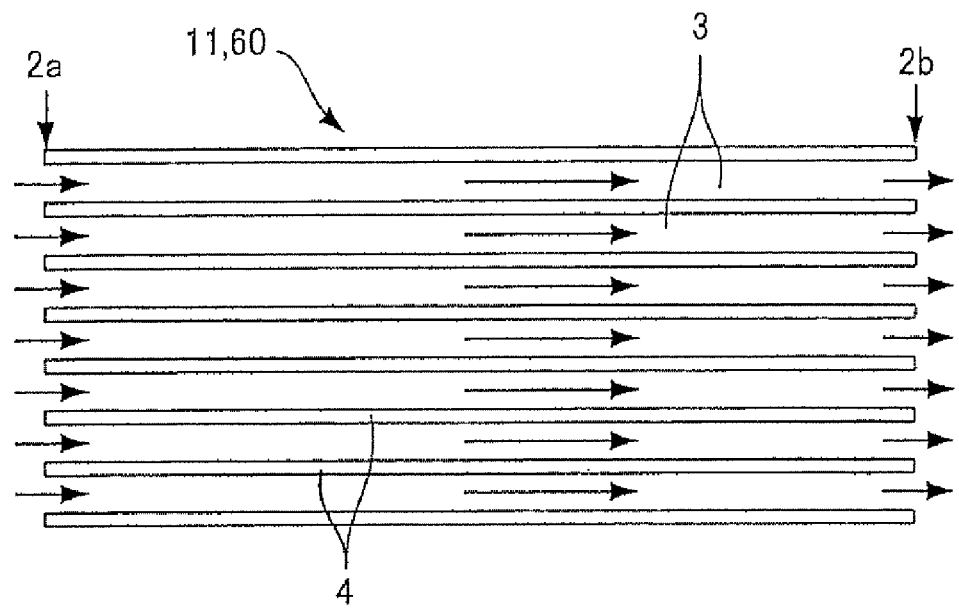
FIG. 5 is a sectional view schematically showing one embodiment of the conventional ceramic catalyst body.
Figure 6:
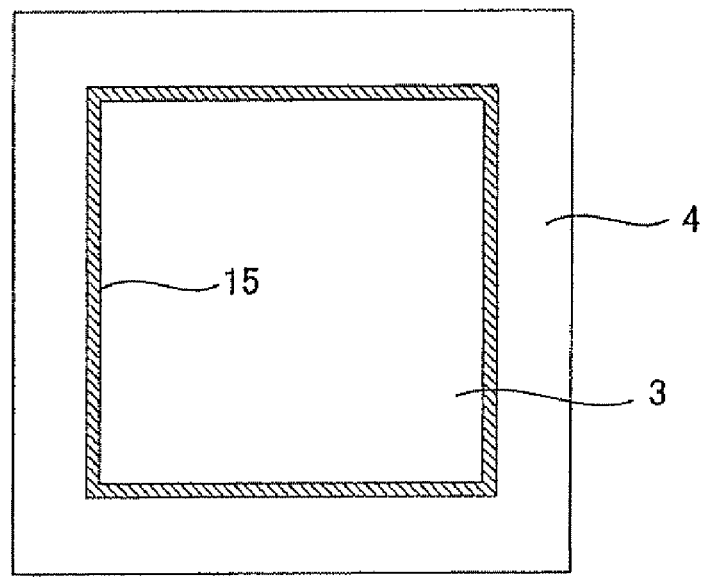
FIG. 6 is a partially enlarged view schematically showing one embodiment of the conventional ceramic catalyst body.

In a ceramic catalyst body 1 shown in FIGS. 1 to 3, a ceramic structure (a honeycomb structure body) having a honeycomb structure in which a plurality of cells 3 communicating between two end faces 2a and 2b are formed by porous partition walls 4 is provided with plugging portions 10 and catalyst layers 5 and 15. In the ceramic catalyst body 1, the plugging portions 10 are arranged so as to plug the cells 3 in one of the end faces 2a and 2b. The catalyst layers 5 are laminated and carried on the inner surfaces of pores 25, and the partition walls 4 are provided with a large number of catalyst carrying pores 35 through which a gas can pass (see FIG. 3). Moreover, the catalyst layers 15 are laminated and carried on the inner surfaces of the cells 3. It is to be noted that in the present description, the inner surfaces of the cells are referred, and they indicate the surfaces of the partition walls (substantial portions) forming and facing the cells. The inner surfaces of the pores mentioned herein indicate the surfaces of the partition walls (substantial portions) forming and facing the pores. In FIG. 1, symbol P is a cell pitch, symbol D is a cell hydraulic diameter, and symbol T is a partition wall thickness, respectively.

In general, ease of transmission of components to be purified included in an exhaust gas in a case where the exhaust gas circulates through channels is inversely proportional to the square of the hydraulic diameter of the channels. Moreover, in the ceramic catalyst body 1 (the ceramic structure), when the hydraulic diameter of the cells 3 is compared with that of the pores 25, the hydraulic diameter of the pores 25 is remarkably small. Therefore, in the ceramic catalyst body 1, when the catalyst layers 15 carried on the inner surfaces of the cells 3 are compared with the catalyst layers 5 carried on the inner surfaces of the pores 25, the components to be purified included in the exhaust gas are easily transmitted through the catalyst layers 5 carried on the inner surfaces of the pores 25. Therefore, the amount of the catalyst (a noble metal) contained in the catalyst layers 5 formed (carried) on the inner surfaces of the pores 25 is increased as compared with the amount of the catalyst (the noble metal) contained in the catalyst layers 15 formed (carried) on the inner surfaces of the cells 3, whereby the purification efficiency of the exhaust gas can be improved.

Examples of the catalyst (the noble metal) contained in the catalyst layers 5 and 15 include catalysts such as a gasoline engine exhaust gas purification three way catalyst, an oxidation catalyst for purifying the exhaust gas from a gasoline engine or a diesel engine and an SCR catalyst for selective reduction of $NO_x$. More specifically, a noble metal such as Pt, Rh, Pd or a combination thereof is preferably used.

In addition, in the ceramic catalyst body 1, the shape of the cross section cut at the surface vertical to a cell communicating direction in a diametrical direction has a circular shape. However, in a case where the ceramic structure is applied as the catalyst body, the structure may preferably be formed into a shape adapted for the inner shape of an exhaust system in which the structure is to be installed. Specifically, in addition to the circular shape, an elliptic shape, an oblong shape, a trapezoidal shape, a triangular shape, a quadrangular shape, a hexagonal shape or a horizontally symmetric heteromorphic shape may be employed.

Next, a process for producing the ceramic structure according to the present invention will hereinafter be described. First, a cordierite forming material is prepared as a material for clay. The components of the cordierite forming material are blended so as to obtain the theoretical composition of cordierite crystals, and hence a silica source component, a magnesia source component, an alumina source component and the like are blended. Among them, it is essential to use the alumina source component having an average particle diameter of 13 μm or more. As the alumina source component, one or both of aluminum oxide and aluminum hydroxide may be employed, because the component includes less impurities.

Examples of the magnesia source component include talc and magnesite, and above all, talc is preferable. It is preferable that 37 to 43 mass % of talc is contained in the cordierite forming material, and talc has particle diameters of preferably 20 to 50 μm from a viewpoint of a decreased thermal expansion coefficient, more preferably 30 to 40 μm. Moreover, the magnesia (MgO) source component may contain impurities such as $Fe_2O_3$, CaO, $Na_2O$ and $K_2O$.

Subsequently, the material for clay (an additive) to be added to the cordierite forming material is prepared. As the additive, at least a binder and pore former are used, and additionally a dispersant and surfactant are used. Examples of the pore former include graphite, flour, starch, a hollow or solid resin such as phenol resin, polymethyl methacrylate, polyethylene or polyethylene terephthalate, foam resin and water absorbing polymer. Specific examples of the foam resin include acrylic microcapsules. Moreover, a shape of these pore formers preferably has a rhombic shape or a confetti-like shape in addition to a spherical form to control the pore shape. Furthermore, the particle diameters of the pore former are preferably set to 30 μm or more and 60 μm or less.

Examples of the binder include hydroxypropyl methyl cellulose, methyl cellulose, hydroxyethyl cellulose, carboxylmethyl cellulose and polyvinyl alcohol. Examples of the dispersant include dextrin and polyalcohol. Moreover, examples of the surfactant include fatty acid soap. It is to be noted that the above additives may be used alone or as a combination of two or more of them in accordance with a purpose.

Subsequently, the material of the plugging portions is prepared. As the material of the plugging portions, the same clay material as that of a ceramic structure main body may be used, but a material blended in a different manner may be used. For example, a ceramic material, the surfactant and water are mixed. If necessary, a sintering aid, the pore former and the like are added and slurried. The resultant mixture can be kneaded using a mixer or the like to obtain the material. As the material of the plugging portions, examples of the ceramic material include α-alumina, calcined bauxite, aluminum sulfate, aluminum chloride, aluminum hydroxide, rutile and anatase type titanium, ilmenite, electrofused magnesium, magnesite, electrofused spinel, kaolin, silica glass, quartz and molten silica. Examples of the surfactant include fatty acid soap, fatty acid ester and polyalcohol.

Subsequently, the material for clay is kneaded to obtain the clay, and the clay is formed into a shape having, for example, a honeycomb structure by an extrusion forming process, a injection forming process, a press forming process or the like to form a ceramic formed green body. It is preferable to employ the extrusion forming process, because continuous forming can easily be performed and, for example, cordierite crystals can be oriented so as to obtain low thermal expansion. The extrusion forming process can be performed using an apparatus such as a vacuum clay kneader, a ram type extruder or a biaxial screw type continuous extruder. Then, for example, in one end face of the ceramic formed green body (a formed honeycomb body), a part of the cells are masked, and the end face is immersed into a storage container in which the material of the plugging portions is stored. The plugging portions are formed by means for filling, with the plugging portion material, the cells which are not provided with any mask.

Subsequently, the formed crude ceramic body provided with the plugging portions is dried. The ceramic formed body can be dried by hot air drying, microwave drying, dielectric drying, reduced pressure drying, vacuum drying or freeze-drying. It is preferable to perform combined drying of hot air drying and microwave drying or dielectric drying, because the whole body can quickly and uniformly be dried. Subsequently, finally, the dried ceramic formed body is fired. During the firing, usually, the ceramic formed body using the cordierite forming material is fired in the atmospheric air at a temperature of 1410 to 1440° C. for 3 to 15 hours. It is to be noted that the drying and the firing may continuously be performed.

EXAMPLES

Examples of the present invention will hereinafter specifically be described, but the present invention is not limited to these examples.

Examples 1 to 9 and Comparative Examples 1 to 3

A main material (a cordierite forming material) was mixed in accordance with an average particle diameter and blend ratio shown in Table 1 to prepare various materials. As shown in Table 1, Examples 1 to 9 include alumina having particle diameters of 15 μm. On the other hand, Comparative Examples 1 to 3 does not include any alumina having the particle diameters of 15 μm, and alumina has particle diameters of 2 to 12 μm. It is to be noted that the particle diameters were an average particle diameter measured using a particle size distribution measurement device LA-910 manufactured by HORIBA, Ltd.

Subsequently, 100 parts by mass of these materials were mixed with a pore former, a binder and a dispersant in amounts (parts by mass) shown in Table 1, and the resultant mixture was kneaded to obtain a clay having plasticity. Then, the resultant clay was formed into a cylindrical shape by use of a vacuum clay kneader, and was further formed into a shape having a honeycomb structure by use of an extrusion forming machine to obtain a ceramic formed body. The respective ceramic formed bodies obtained in this manner and including different types of cordierite forming materials were dielectrically dried, and further completely dried by hot air drying. Afterward, the dried body was once fired at 1420° C. for ten hours to obtain a ceramic structure having a partition wall thickness of 480 μm and a cell density of 80 cpsi and including cells which were not plugged.

Subsequently, both cell opening end faces of the ceramic structure (a honeycomb structure body) in which any cell was not plugged were plugged alternately (in a checkered pattern) by use of the slurry of the plugging portion material in which the same material as the above material for clay was blended at an equal ratio. Afterward, the structure was fired again at 1420° C. for four hours to obtain the ceramic structure having a partition wall thickness of 480 μm, a cell density of 80 cpsi and a size of 100 mm in diameter and 100 mm in length.

Subsequently, any catalyst layer was not formed on the resultant ceramic structure, and pore distribution, average pore diameter, porosity and thermal expansion coefficient described later were evaluated with respect to the ceramic structure as it was. Results are shown in Table 1.

Then, powder which was impregnated with platinum by use of a dinitrodiammine platinum solution by a known technique to carry platinum and which included 70 parts by mass of γAl$_2$O$_3$ powder, 20 parts by mass of CeO$_2$ powder and 10 parts by mass of ZrO$_2$ powder was blended with water so as to obtain a solid content of 30%. The powder was subjected to wet disintegration for 100 hours to obtain a Pt catalyst coating solution in which a 90% particle diameter (D$_{90}$) was 5 μm (measured with a laser diffraction/scattering type particle diameter distribution measurement device manufactured by HORIBA, Ltd.). The amount of the dinitrodiammine platinum solution for use was set to such a ratio that a Pt content was 1 g/L (a ceramic structure volume) at a time when the amount of the catalyst with which the ceramic structure was coated was set to 50 g/L (the ceramic structure volume). Moreover, γAl$_2$O$_3$ powder which was similarly impregnated with rhodium by use of a rhodium nitrate solution to carry rhodium was blended with water so as to obtain a solid content of 30%. The powder was subjected to wet disintegration for 100 hours to obtain an Rh catalyst coating solution in which the 90% particle diameter (D$_{90}$) was 5 m. The amount of the rhodium nitrate solution for use was set to such a ratio that an Rh content was 0.2 g/L (the ceramic structure volume) at a time when the amount of the catalyst with which the ceramic structure was coated was set to 10 g/L (the ceramic structure volume).

Then, the catalyst layers were formed on the ceramic structure by use of the resultant Pt catalyst coating solution and Rh catalyst coating solution. Specifically, the ceramic structure was first impregnated with the Pt catalyst coating solution by a known dipping process, and lifted up. Afterward, a surplus solution was blown with compressed air. The structure was then subjected to hot air drying at 150° C. and a thermal treatment at 550° C. for one hour, and coated with the Pt catalyst. The coating amount of the Pt catalyst coating solution was adjusted into 50 g/L (the ceramic structure volume) in a thermally treated state. When the amount was less than 50 g/L, the impregnating and drying step was repeated to adjust the amount. Subsequently, the structure was similarly coated with 10 g/L (the ceramic structure volume) of the Rh catalyst coating solution.

Subsequently, the ceramic structure provided with the catalyst layers (also referred to as the ceramic structure provided with the catalyst) was subjected to an engine durability test described later, and a mass increase before and after the test, a pressure loss relative index and purification efficiency were evaluated. Results are shown in Table 1.

Figure 7:
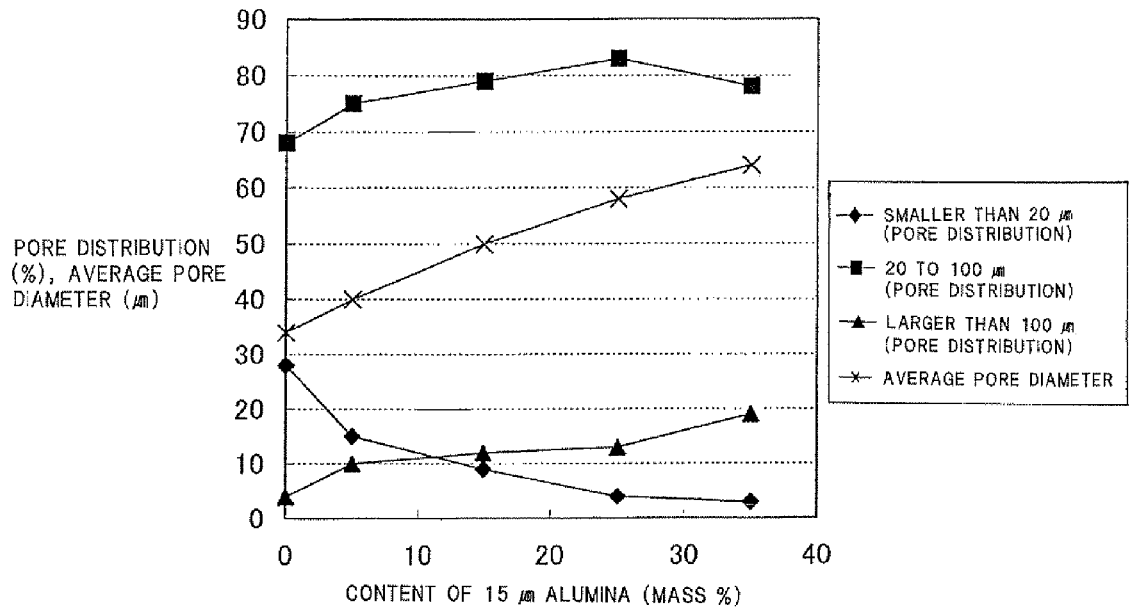
FIG. 7 is a graph showing a relation between the content of alumina having an average diameter of 15 μm and pore distribution and average pore diameter in an example.

[Pore distribution and average pore diameter] The pore distribution and average pore diameter (a median diameter converted in terms of volume) were measured with a mercury penetration porosimeter manufactured by Micrometric Co. (see Table 1). As shown in Table 1, in Examples 1 to 9, the volume of pores having pore diameters smaller than 20 μm accounted for 15% or less of the total pore volume, and the volume of pores having pore diameters of 20 to 100 μm accounted for 71% or more of the total pore volume. Moreover, it has also been confirmed that the volume of pores having pore diameters larger than 100 μm accounts for 26% or less of the total pore volume (21% or less except Example 5) and that the ceramic structures obtained in Examples 1 to 9 were suitable for preparing a catalyst body having a reduced pressure loss. On the other hand, in Comparative Examples 1 to 3, with regard to the pore distribution, the volume of pores having pore diameters larger than 100 μm accounted for 4% or less of the total pore volume, and the volume of the pores having pore diameters smaller than 20 μm accounted for 24 to 36% of the total pore volume. The volume of pores having pore diameters of 20 to 100 μm accounted only for 61 to 73% of the total pore volume. FIG. 7 shows a relation between the content of alumina having an average diameter of 15 μm and the pore distribution and average pore diameter. Zero mass % of alumina having an average diameter of 15 μm corresponds to Comparative Example 3, 5 mass % corresponds to Example 7, 15 mass % corresponds to Example 8, 25 mass % corresponds to Example 1, and 35 mass % corresponds to Example 9. When 5% or more of alumina having an average diameter of 15 μm is used, the volume of the pores having pore diameters smaller than 20 μm can be set to 15% or less. It is to be noted that when the content of alumina is 35 mass % or more, a cordierite composition cannot be obtained.

[Porosity]: The true specific gravity of cordierite was set to 2.52 g/cm$^3$, and the porosity was calculated from the total pore volume obtained with the mercury penetration porosimeter manufactured by Micrometric Co.

[Thermal expansion coefficient]: The coefficient was measured in conformity to a method described in a test method (JASO M 505-87) of a ceramic monolith carrier for a car exhaust gas purification catalyst according to the car standard established by the standard meeting of Society of Automotive Engineers of Japan.

[Engine durability test] The ceramic structure provided with the catalyst was mounted on an exhaust line of a gasoline engine having six V-type cylinders on a 3.5 L base, and continuously operated at a constant speed of 90 km/hr for 200 hours.

[Mass increase]: The masses of the ceramic structure provided with the catalyst were measured before and after the engine durability test, and a mass increase due to the engine durability test was calculated from a difference between both the masses. After the end of all measurement, the ceramic structure provided with the catalyst was blown from the outlet side thereof with compressed air, and collected particulate powder-like substances were analyzed. As a result, it was confirmed that the mass increase was caused by the vthe volume of ash derived from soot, Ca or the like discharged from the engine in the engine durability test.

Figure 8:
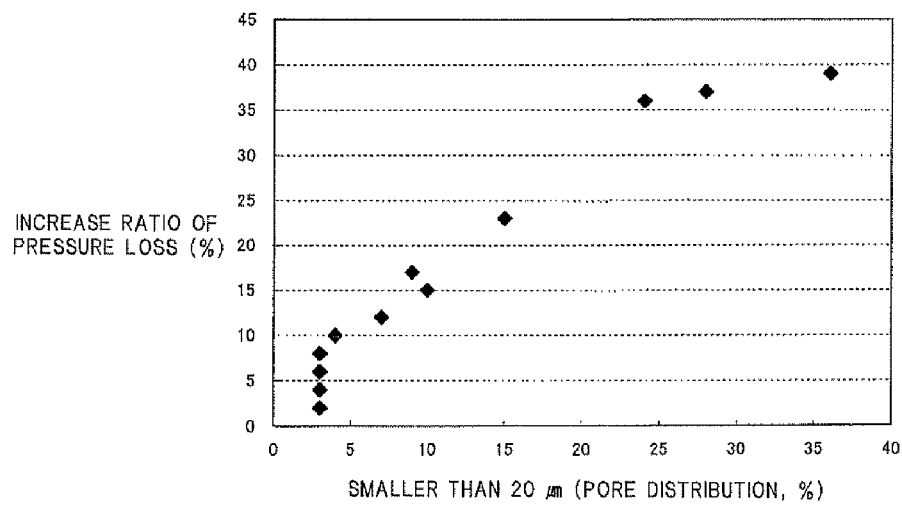
FIG. 8 is a graph showing a relation between the ratio of the volume of pores having pore diameters smaller than 20 μm with respect to the total pore volume and the increase ratio of pressure loss in the example.

[Pressure loss relative index]: The initial pressure loss of the ceramic structure provided with the catalyst before the engine durability test was measured at 20° C. by pressure loss measuring device, and the increase ratio of the pressure loss due to the engine durability test was calculated from a difference between the measurement result and the pressure loss similarly measured after the engine durability test. The pressure losses before and after the engine durability test are indicated as a relative index in a case where the initial pressure loss of Comparative Example 1 is 100 (see Table 1). FIG. 8 shows a relation between the ratio of the volume of pores having pore diameters smaller than 20 μm with respect to the total pore volume and the increase ratio of the pressure loss. From the result of the pressure loss, as the volume of the pores having pore diameters smaller than 20 μm is small in the pore distribution, the increase ratio of the pressure loss decreases. This is supposedly because the number of the pores having pore diameters smaller than 20 μm is small, and the ash content and soot with which the pores are clogged can be decreased.

Figure 9:
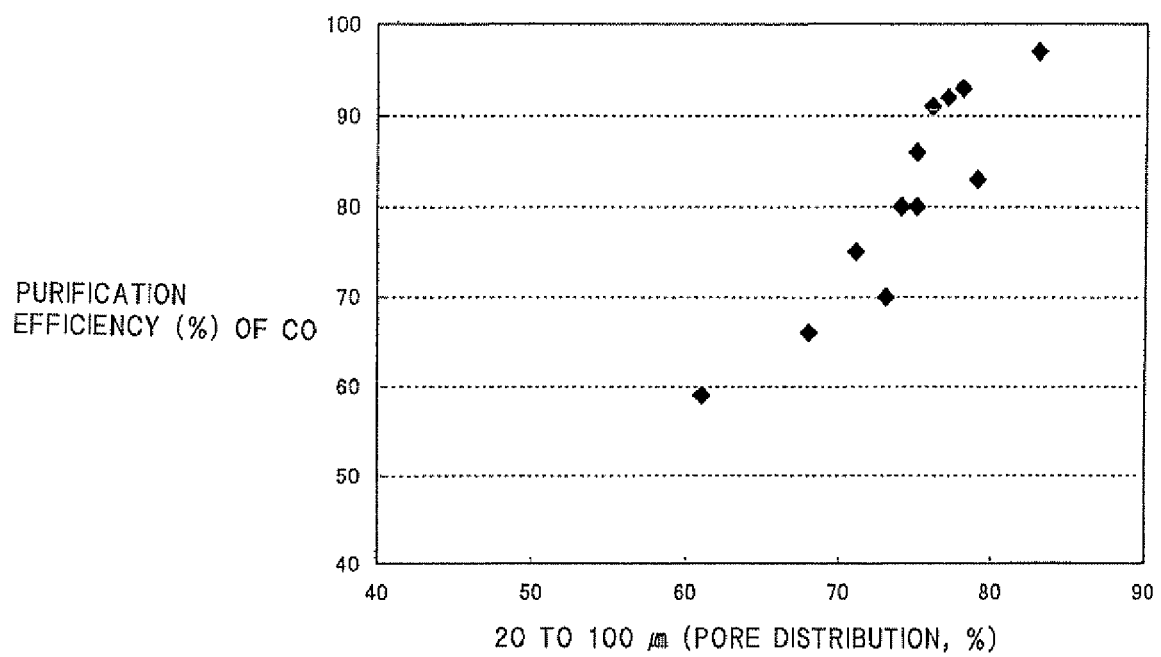
FIG. 9 is a graph showing a relation between the ratio of the volume of pores having pore diameters of 20 to 100 μm with respect to the total pore volume and the purification efficiency of CO in the example.

[Purification efficiency]: The ceramic structure provided with the catalyst and subjected to the engine durability test was mounted on an exhaust line of a gasoline engine having four serial cylinders on a 1.8 L base. The engine was steadily operated, and an engine exhaust gas (with a stoichiometric composition) was mixed with cooling air on the upstream side of the ceramic structure provided with the catalyst, whereby the inlet gas temperature of the ceramic structure provided with the catalyst was adjusted into 400° C., and the purification efficiency of the exhaust gas was obtained. The measurement position of the inlet gas temperature was a position at 10 mm traced from the inlet-side end face of the center of the cross section of the ceramic structure provided with the catalyst on the upstream side of an exhaust gas flow direction. The concentration of CO, HC and NOx in the exhaust gas was measured (an exhaust gas analysis meter manufactured by HORIBA, Ltd.) was measured in front and rear of the ceramic structure provided with the catalyst, and the purification efficiency was calculated from purification efficiency (%)=(front concentration−rear concentration)/front concentration×100. FIG. 9 shows a relation between the ratio of the volume of pores having pore diameters of 20 to 100 μm with respect to the total pore volume and the purification efficiency of CC. It has been confirmed that as the volume of the pores having pore diameters of 20 to 100 μm is large, the purification efficiency improves. This is supposedly because the pores are uniform, and hence the exhaust gas uniformly flows through the pores, whereby the purification efficiency of the catalyst improves.

TABLE 1

| | | Unit | Comparative Example 1 Blend ratio | Comparative Example 2 Blend ratio | Comparative Example 3 Blend ratio | Example 1 Blend ratio | Example 2 Blend ratio | Example 3 Blend ratio | Example 4 Blend ratio | Example 5 Blend ratio | Example 6 Blend ratio | Example 7 Blend ratio | Example 8 Blend ratio | Example 9 Blend ratio |
|---|---|---|---|---|---|---|---|---|---|---|---|---|---|---|
| Main material | Talc | Average particle diameter 24 μm | Mass % | 42.0 | 42.0 | 42.0 | 42.0 | 42.0 | 42.0 | 42.0 | 42.0 | 42.0 | 42.0 | 42.0 | 43.0 |
| | | 35 μm | Mass % | 20.0 | 20.0 | 20.0 | | | | | | | | | |
| | Kaolin | 10 μm | Mass % | 25.0 | 25.0 | | 20.0 | 20.0 | 20.0 | 20.0 | 20.0 | 20.0 | 20.0 | 20.0 | |
| | Alumina | 2 μm | Mass % | | | 25.0 | 25.0 | 25.0 | 25.0 | 25.0 | 25.0 | 25.0 | | | |
| | | 12 μm | Mass % | | | | | | | | | | | 10.0 | 35.0 |
| | | 15 μm | Mass % | | | | | | 13.0 | | | 8.0 | 5.0 | 15.0 | |
| | Silica | 40 μm | Mass % | 13.0 | 13.0 | 13.0 | 13.0 | 13.0 | | 13.0 | 13.0 | 7.0 | 13.0 | 13.0 | 22.0 |
| | | 80 μm | Mass % | | | | | | | | | | 8.0 | 8.0 | 8.0 |
| Pore former | Foam resin | 64 μm | Parts by mass | 8.0 | 8.0 | 8.0 | 8.0 | 8.0 | | | | | | | |
| | Graphite | 80 μm | Parts by mass | | | | | | 20.0 | 20.0 | 25.0 | 20.0 | | | |
| | Water absorbing polymer | 40 μm | Parts by mass | | | | | | 4.0 | 4.0 | 4.0 | 4.0 | | | |
| | Binder | | Parts by mass | 6.0 | 6.0 | 6.0 | 6.0 | 6.0 | 6.0 | 6.0 | 6.0 | 6.0 | 6.0 | 6.0 | 6.0 |
| | Surfactant | | Parts by mass | 0.10 | 0.10 | 0.10 | 0.10 | 0.10 | 0.10 | 0.10 | 0.10 | 0.10 | 0.10 | 0.10 | 0.10 |
| Pore distribution | Smaller than 20 μm | | % | 36 | 24 | 28 | 4 | 3 | 10 | 3 | 3 | 7 | 15 | 9 | 3 |
| | 20 to 100 μm | | % | 61 | 73 | 68 | 83 | 77 | 74 | 76 | 71 | 75 | 75 | 79 | 78 |
| | Larger than 100 μm | | % | 3 | 3 | 4 | 13 | 20 | 16 | 21 | 26 | 18 | 10 | 12 | 19 |
| | Average pore diameter | | μm | 28 | 35 | 34 | 58 | 70 | 60 | 70 | 72 | 65 | 40 | 50 | 64 |
| | Thermal expansion coefficient | | ×10⁻⁶/° C. | 0.6 | 0.7 | 0.6 | 0.5 | 0.6 | 0.6 | 0.7 | 0.7 | 0.6 | 0.6 | 0.6 | 1.0 |
| | Porosity | | % | 60 | 62 | 64 | 65 | 64 | 64 | 66 | 68 | 64 | 64 | 64 | 66 |
| | Mass increase | | g | 8.1 | 7.6 | 7.7 | 1.3 | 0.7 | 1.1 | 0.6 | 0.2 | 1.3 | 2.0 | 1.6 | 0.7 |
| Pressure loss relative index | Initial | | — | 100 | 95 | 91 | 65 | 56 | 68 | 52 | 45 | 63 | 80 | 72 | 60 |
| | After engine durability test | | — | 139 | 129 | 125 | 72 | 59 | 78 | 54 | 46 | 71 | 98 | 84 | 65 |
| | Increase ratio | | % | 39 | 36 | 37 | 10 | 6 | 15 | 4 | 2 | 12 | 23 | 17 | 8 |
| Purification efficiency | CO | | % | 59 | 70 | 66 | 97 | 92 | 80 | 91 | 75 | 86 | 80 | 83 | 93 |
| | HC | | % | 62 | 71 | 64 | 95 | 90 | 80 | 90 | 76 | 86 | 79 | 85 | 92 |
| | NOx | | % | 57 | 68 | 61 | 94 | 91 | 81 | 91 | 77 | 87 | 79 | 82 | 91 |
| | Rank | | | 10 | 8 | 9 | 1 | 2 | 5 | 2 | 7 | 3 | 6 | 4 | 2 |

INDUSTRIAL APPLICABILITY

A ceramic structure according to the present invention carries a catalyst thereon, and is thereby suitably utilized as a ceramic catalyst body for suitable use in purification of components to be purified, for example, carbon monoxide (CO), hydrogen carbide, nitrogen oxide ($NO_x$) and sulfur oxide ($SO_x$) included in an exhaust gas discharged from a stational engine for a car, construction machine or industry, a burning appliances or the like.

The invention claimed is:

1. A ceramic structure which comprises a material having a controlled pore distribution and including cordierite as a main crystal phase,
    wherein in the pore distribution, a volume of pores having pore diameters smaller than 20 µm accounts for 15% or less of the total pore volume, a volume of pores having pore diameters of 20 to 100 µm accounts for 70% or more of the total pore volume, a volume of pores having pore diameters larger than 100 µm accounts for 12% to 21% of the total pore volume and an average pore diameter is within a range from 50 µm to 70 µm,
    a total volume percent of pores is equal to a sum of the pores having pore diameters smaller than 20 µm, that of pores having pore diameters 20 to 100 µm, and that of pores having pore diameters larger than 100 µm, and
    a thermal expansion coefficient at 40 to 800° C. is $0.8 \times 10^{-6}$/° C. or less.

2. The ceramic structure according to claim 1, wherein the porosity is in a range of 50 to 70%.

3. The ceramic structure according to claim 1, which possesses a honeycomb structure in which a plurality of cells communicating between two end faces are formed by partition walls.

* * * * *